3 Sheets--Sheet 1.

F. M. RAY, Sr., dec'd.
F. M. RAY, Jr., Exct'r.

Car-Wheels.

No. 6,116.

Reissued Nov. 3, 1874.

*Witnesses:*
James K. Shidmore
R. M. Parr.

James A. Woodbury
assee. of F. M. Ray Jr.
By his attys.
Howson & Son

3 Sheets--Sheet 2.

F. M. RAY, Sr., dec'd.
F. M. RAY, Jr., Exct'r.

Car-Wheels.

No. 6,116.

Reissued Nov. 3, 1874.

Witnesses:
James R. Shidmore.
R. M. Barr.

James A. Woodbury
Assge. of F. M. Ray Jr.
by his attys.
Howson & Son

3 Sheets--Sheet 3.

F. M. RAY, Sr., dec'd.
F. M. RAY, Jr., Exec'r.
Car-Wheels.

No. 6,116.

Reissued Nov. 3, 1874.

Witnesses:
James L. Skidmore
R. M. Parr.

James A. Woodbury
Assgee. of F. M. Ray, Jr
By his attys.
Howson & Son

UNITED STATES PATENT OFFICE.

JAMES A. WOODBURY, OF BOSTON, MASSACHUSETTS, ASSIGNEE, BY MESNE ASSIGNMENTS, OF FOWLER M. RAY, JR., EXECUTOR OF FOWLER M. RAY, SR., DECEASED.

IMPROVEMENT IN CAR-WHEELS.

Specification forming part of Letters Patent No. 126,085, dated April 23, 1872; reissue No. 6,116, dated November 3, 1874; application filed October 3, 1874.

*To all whom it may concern:*

Be it known that FOWLER M. RAY, Sr., late of the city and county of New York and State of New York, did invent an Improvement in Railway-Car Wheels, of which the following is a specification:

The object of the invention of the said FOWLER M. RAY, Sr., is a car-wheel, in which a body of elastic material is arranged to absorb the shocks and vibrations which would otherwise be transmitted to the axle, but so as to prevent any extended movement of one section of the wheel independently of the other.

Figure 1:
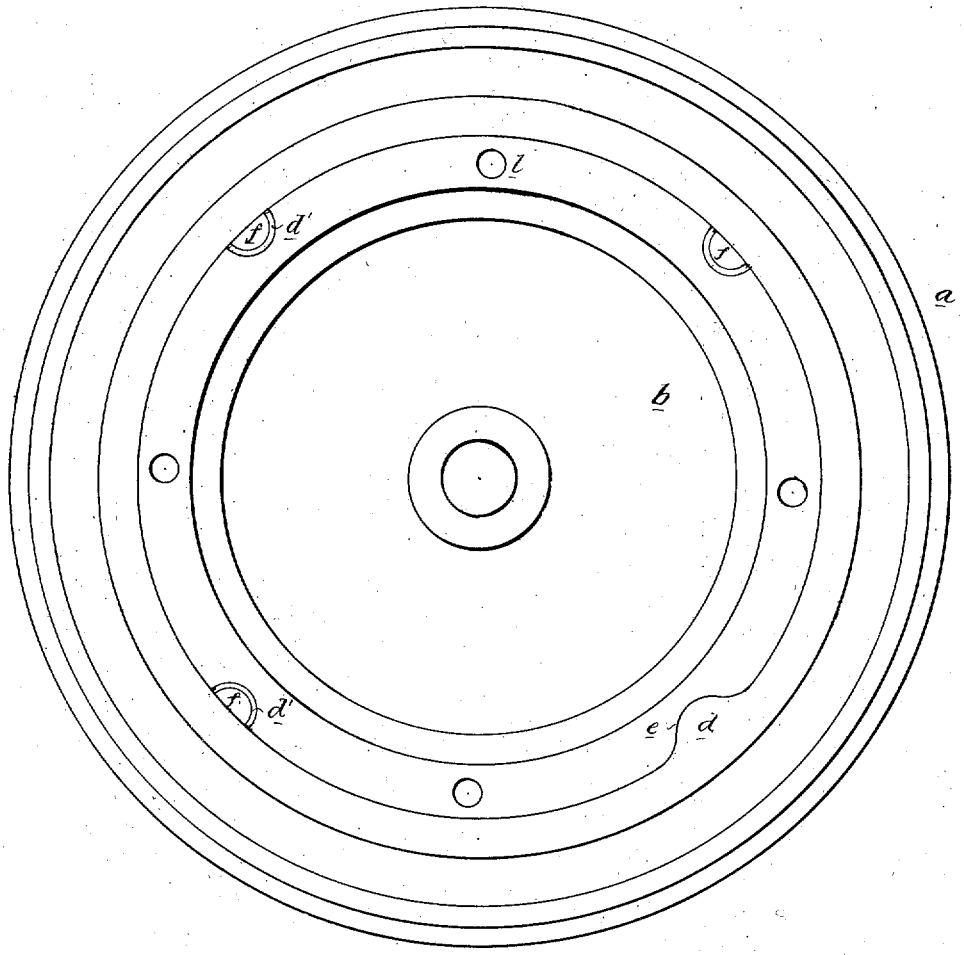
Figure 3:
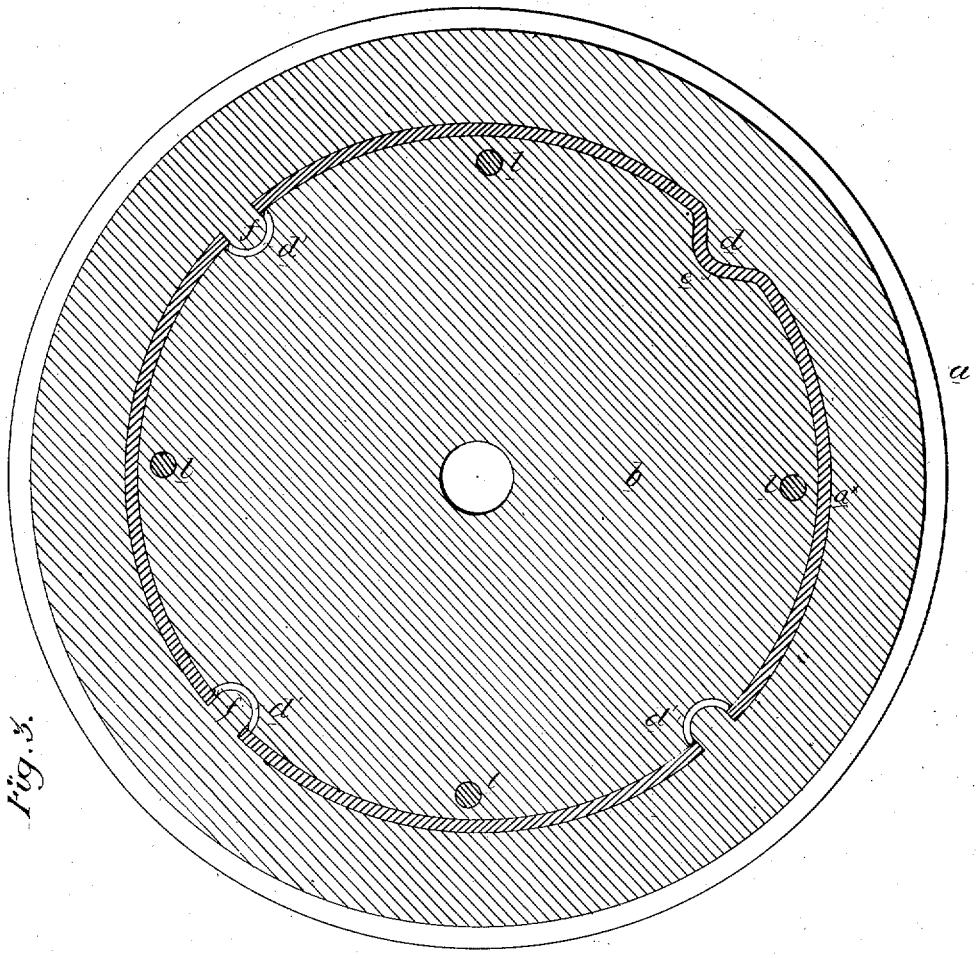
Figure 2:
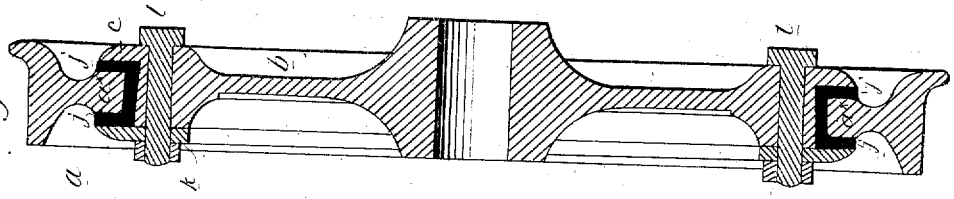

In the accompanying drawing, Figure 1 is an elevation, showing the outer face of the wheel, one section of the hub being removed; Fig. 2, a transverse section through the center of the wheel; Fig. 3, a section in the plane of the wheel; and Fig. 4, a modification.

The wheel consists essentially of a hub or inner section, *b*, a detachable rim, *a*, and intervening body of vulcanized rubber or other elastic material. Within the rim *a* is an annular rim, $a^{\times}$, which extends into a groove formed in the periphery of the hub by a permanent flange, *c*, at the inner side, and a detachable ring, *k*, which constitutes one section of the hub, at the outer side. Four projections, *f f f d*, on the rim, extend into corresponding but somewhat larger recesses, *d′ d′ d′* and *e*, in the periphery of the hub.

The body of rubber between the two metal sections of the wheel is in the form of a ring, lying in the groove of the hub, and having two flanges, *j j*, which embrace the opposite faces of the rib $a^{\times}$, the ring being perforated for the passage of the projections *f f f*, and that portion opposite the recess *e* being forced into the latter by the projection *d*.

In putting the wheel together, the rubber ring is first applied to the rib $a^{\times}$. The hub is then inserted until the flange *c* bears against the inner flange *j*. The ring *k* is then applied to the larger section of the hub, against the outer flange *j*, and is secured by bolts or rivets *l*, which pass through holes in the hub near the periphery, and through the ring.

The parts of the wheel should be fitted together under such great pressure as will bring the inner faces of the flange *c* and ring *k* nearly in contact with the sides of the rim $a^{\times}$, thus condensing the body of rubber between the hub and the rim to a great density.

The rubber being between the rim and the hub, lying upon both sides of the rib $a^{\times}$, within the rim, and also upon both sides of the projection *d*, is in a position to resist the radial, rotary, or lateral motions of the rim upon the hub, and will effectually prevent any such movements except to that imperceptible degree, which, while not sufficient to to change the position of the rim upon the rubber, is yet enough to effectually absorb the jars and vibrations which would otherwise be transmitted to the axle.

Figure 4:
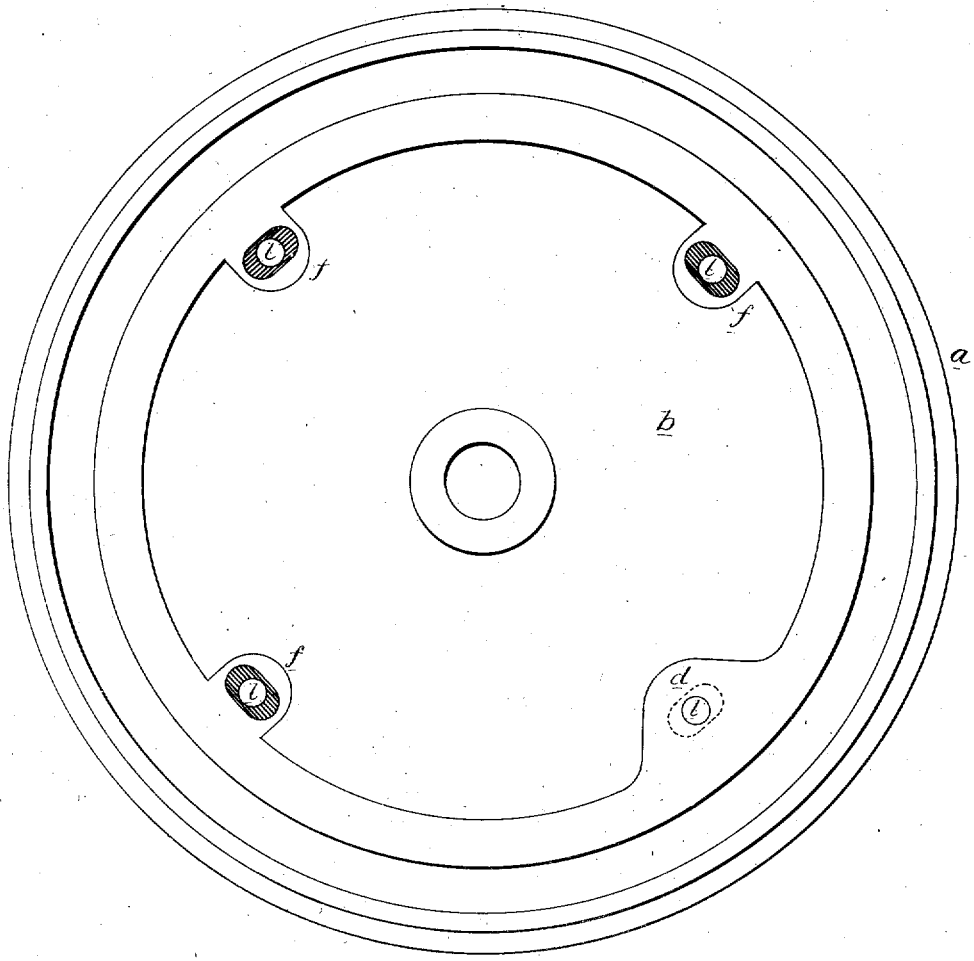

If desired, rubber can be interposed between all the projections on the rim and the hub, and the projections may also be increased in size, to permit the passage of the bolts, the openings being enlarged to prevent any contact of the rim and bolts, Fig. 4. If desired, also, other substances may be substituted for vulcanized rubber.

What is claimed as the invention of the said FOWLER M. RAY, Sr., is—

1. A car-wheel, in which are combined a center or hub, a rim having no direct bearing on the hub, and an intervening body of elastic material compressed to a great density, substantially as set forth.

2. The combination, in a car-wheel, of the hub *b*, having a grooved periphery, a rim, *a*, having a rib extending into said groove, and intervening elastic material compressed within the groove upon both sides of said rib, substantially as set forth.

3. A car-wheel, in which are combined a hub consisting of two sections, a rim, and intervening elastic material compressed between the rim and the hub on bringing together the two sections of the latter, as set forth.

4. A car-wheel, in which are combined a hub, a movable rim, and elastic material placed between shoulders of the hub and rim, so as to be compressed upon any rotary motion of the rim, substantially as set forth.

5. The combination of the hub, rim, intervening elastic material, and projections on the rim having enlarged openings for the passage of bolts connected to the hub, as set forth.

6. A car-wheel, consisting of a hub, a rim, and intervening body of elastic material confined between ribs or shoulders upon the hub and rim, and compressed to a great density, as set forth.

JAMES A. WOODBURY.
*Assignee.*

Witnesses:
E. FRANK WOODBURY,
P. E. TUCKER.